United States Patent [19]

Ehrhardt et al.

[11] 3,941,608
[45] Mar. 2, 1976

[54] FLOW AGENT FOR INK SYSTEMS

[75] Inventors: Gerry H. Ehrhardt, West Des Moines; Ronald L. Reeves, Des Moines, both of Iowa

[73] Assignee: Frye Copysystems, Inc., New York, N.Y.

[22] Filed: May 23, 1973

[21] Appl. No.: 363,083

[52] U.S. Cl. .................. 106/285; 106/31; 106/32; 106/270; 252/357
[51] Int. Cl.² B01F 17/00; C09D 3/00; C09D 11/10
[58] Field of Search ............ 260/453 P; 106/31, 32, 106/270, 285; 252/357

[56] References Cited
UNITED STATES PATENTS
3,163,548   12/1964   Stark, Jr. .............................. 106/31

Primary Examiner—Lewis Gotts
Assistant Examiner—Dolph H. Torrence
Attorney, Agent, or Firm—Robert E. Isner

[57] ABSTRACT

An improved dispersant and flow agent for ink systems formed from a selectively oxidized linear unsaturated hydrocarbon having a carbon to carbon terminal double bond and a process for forming the same.

6 Claims, No Drawings

-continued

C$_{24}$ and below      2% by weight max.

and the following typical properties:

| | |
|---|---|
| Specific gravity, 60°/60°F. | 0.3270 |
| Flash, COC | 470°F. |
| Viscosity, SUV; Sec.210°F. | 46.5 |
| Viscosity Kin, Cs at 210°F. | 6.30 |
| Color, Saybolt | +8 |
| Melting Point, D127 | 154°F |
| Congealing Point D938-68 | 152°F, | is heated to about 375°F. ± 10° in an aluminum or stainless steel vessel or in a glass vessel with an aluminum or stainless steel liner or stirrer. For some unknown reason, the presence of aluminum or iron (stainless steel) acts as a catalyst to the oxidation reaction. Air is then passed through the melt by means of a metallic or ceramic dispersion screen at the rate of about 1.0 to 2.0 cubic centimeters per minute per gram of melt until the acid number reaches about 7. The time of oxidation will run from about 3 to 12 hours depending upon the temperature, with more rapid oxidation being effected at higher temperatures, or with an effectively increased volume of oxygen. When the acid number reaches about 7, the saponification number of the oxidized linear hydrocarbon will desirably be about 20 or less.

Upon the conclusion of the oxidation reaction, the temperature of the melt is reduced to a value in the range of about 180°F. to 270°F. and about 0.4 to about 6.0%, and preferably about 1.0% of monoethanolamine is added thereto and the nitrification reaction is permitted to proceed with moderate stirring, for about 4 hours. In practice and where large volumes are involved, a single vessel may be employed and the nitrifying reagent added thereto at any desired time as the temperature is reduced from that of the oxidation step. For example, monoethanolamine may be added as the temperature of the charge is being reduced through about 250°F. Upon termination thereof, the nitrogen content of the oxidized hydrocarbon will be appreciably less than 0.19% by weight and suitably will be in about the range of 0.09 to 0.11% nitrogen by weight. Upon the conclusion of the nitrification reaction, about 4 to 8%, and preferably about 6%, of an organic isocyanate, such as 2,4 tolylene diisocyanate, is then added to the melt and the same is maintained at a temperature in the above range and preferably at the lower end thereof, again with moderate stirring, for about 3 more hours. 2,6 tolylene diisocyanate, polymethylene, polyphenyl isocyanate and pp' diphenyl methane diisocyanate may also be employed, although the 2,4 tolylene diisocyanate is presently preferred.

The resultant product differs rather markedly from the conventionally employed natural and synthetic hard waxes. The resultant product will be of appreciably softer character as measured by conventional penetration tests and will be possessed of somewhat lesser oil retention properties than the conventionally employed materials. The resultant product is essentially a flow and dispersing agent having gel inhibiting properties and performing functions similar to, but measurably better than, those of the "flow wax" materials conventionally employed in carbon paper ink formulations, to thereby permit, for example, the economic formulation of satisfactory, if not improved, carbon paper inks.

Having thus described our invention, we claim:

1. A method forming an improved dispersant/flow agent for mixtures of finely divided solid materials in liquifiable vehicles comprising the steps of
   oxidizing a linear unsaturated alpha olefinic hydrocarbon having at least 20 carbon atoms in the linear chain thereof, a melting point of about 70°F. to 200°F. and a terminal carbon to carbon double bond at a temperature of at least 300°F. to an acid number of no greater than about 8 and a saponification number of no greater than about 25,
   reacting said oxidized hydrocarbon with an amine selected from the group consisting of ammonia, monoethanolamine and mono substituted amine homologs thereof at a temperature less than about 270°F. to produce a modified oxidized hydrocarbon containing less than 0.19% nitrogen by weight thereof,
   and reacting said modified oxidized hydrocarbon with about 3 to about 9% of an organic isocyanate selected from the group consisting of 2,4 tolylene diisocyanate, 2,6 tolylene diisocyanate, polymethylene polyphenyl isocyanate and pp' diphenyl methane diisocyanate at a temperature below about 220°F.

2. The product of the process of claim 1.

3. The method as set forth in claim 1 wherein said alpha olefinic hydrocarbon is at least 98.5% mono-olefinic.

4. The method as set forth in claim 1 wherein said alpha olefinic hydrocarbon has 24 or more carbon atoms in the linear chain thereof.

5. The product of the process of claim 3.

6. The product of the process of claim 4.

* * * * *

FLOW AGENT FOR INK SYSTEMS

This invention relates to improved dispersant and flow agent compositions for mixtures of finely divided solid materials in readily liquifiable vehicles such as ink systems or the like and particularly to improve dispersant-flow agents for carbon paper inks and to a process for making the same.

Inclusion of certain vegetable waxes, as carnauba or ouricury or certain mineral waxes, such as Montan or modified Montan waxes have long been conventionally utilized to impart highly beneficial hardness and oil retention properties to ink systems, such as carbon paper ink formulations, as well as to enhance the dispersion properties thereof. The continually increasing price of such materials, coupled with the uncertainties attendant their common sources of supply, has forced users thereof to utilize continually decreasing amounts thereof in carbon paper inks for selective functioning as "flow waxes" to obtain satisfactory dispersion properties therein with other and less expensive materials being substituted therefor to impart the desired hardness and oil retention properties thereto. Even in such reduced amounts, however, the material costs have risen to such an extent as to pose serious economic problems for carbon paper manufacturers. All efforts to date to provide domestically available synthetic waxes having at least some of the requisite properties, as for example, the modified synthetic waxes disclosed in U.S. Pat. Nos. 2,890,124, 2,890,125, and 3,163,548 are likewise characterized by such high costs for the resultant product as to accentuate rather than to alleviate the basic problem. Apart from the cost factor as above noted, the resultant utilization of increasing amounts of paraffin wax and other substitutes for the named vegetable and mineral waxes has increased the likelihood of detrimental gelling of the ink systems being formulative therefrom.

This invention may be briefly described as an improved dispersant flow agent composition for ink systems, and particularly for carbon paper inks, and method of forming the same. In its broader aspects, such composition comprises the resultant product obtained by reacting a selectively oxidized linear unsaturated hydrocarbon having a carbon terminal double bond with ammonia or a primary organic amine and then further reacting said modified hydrocarbon with an isocyanate. In its narrower aspects, the linear unsaturated hydrocarbon consists of alpha olefins that are at least 98.5% mono-olefinic in character and have at least 20 (i.e. $C_{20}+$) and preferably at least 24 (i.e. $C_{24}+$) carbon atoms in the linear chain thereof and are of such character that when oxidized, have an acid number of no greater than about 8 and, when further modified by treatment with ammonia or an organic amine, have a nitrogen content or markedly less than 0.19% by weight thereof.

Among the advantages of the subject invention is the provision of an effective dispersant for finely divided solids in liquifiable vehicles, such as in ink systems and particularly in carbon paper inks having flow imparting properties superior to those of natural waxes such as carnauba, ouricury, and unmodified Montan waxes which, in addition to markedly reducing the hazards of detrimental gelling, can be made available at a fraction of the cost of any of the presently available dispersant materials conventionally employed as flow agents in such environments. A further advantage is the provision of a simple and economic method of forming such improved dispersant characterized by significantly low operating temperatures and markedly reduced raw material costs as compared to those attendant presently available modified natural and synthetic wax dispersants of the type identified above. A still further advantage of the subject invention is the provision of an inexpensive wax-like composition that may be substituted for more expensive natural and synthetic waxes in diverse products incorporating the same, as well as permitting the use of fillers and lower cost wax materials that would normally be unusable.

The primary object of this invention is the provision of a low cost dispersant/flow agent for ink systems, and particularly for carbon paper inks.

A further object of this invention is the provision of an economic method of producing an improved dispersant/flow agent for carbon paper inks from readily available and inexpensive raw materials.

A further object of this invention is the provision of an inexpensive wax-like composition that may be substituted for natural waxes, such as carnauba and ouricury, and mineral waxes such as modified and unmodified Montan wax, in diverse products incorporating the same.

Other objects and advantages of the subject invention will become apparent from the following portions of this specification which, in accord with the mandate of the patent statutes, discloses the principles of the invention as embodied in a presently preferred method of forming the improved dispersant/flow agent product forming the subject thereof.

The base material employed in the practice of the subject invention comprises an essentially linear unsaturated hydrocarbon having a terminal carbon to carbon double bond and a melting point in the range of about 70°F. to 200°F. A highly preferred material is an alpha olefin or an alpha olefin mixture resulting from the controlled growth of ethylene chains to the level of 20 or more (i.e. $C_{20}+$) carbon atoms in the chain. Such alpha olefinic material desirably should be at least 98.5% mono-olefinic in character with the balance, i.e., of no more than 1.5%, composed of paraffinic hydrocarbons. Specifically, aromatic, naphthenic, acetylenic or diolefin compounds should be absent.

In the practice of the subject method, such $C_{20}+$ alpha olefinic material is first heated to a temperature in the range of 300° to 425°F. and is oxidized to an acid number in the range of about 3 to 8, and preferably about 4 to 6, and to a saponification number in the range of 10 to 25, and preferably about 20. The oxidized alpha olefinic material is then reacted with ammonia or a primary organic amine, such as monoethanolamine or a mono-substituted amine homologue thereof at a temperature below about 220°F to produce a modified oxidized alpha olefinic material having markedly less than 0.19% nitrogen by weight thereof and preferably a nitrogen content in the range of about 0.09 to 0.11%. Such modified oxidized product is then reacted with about 3 to 9% of an organic isocyanate at a temperature of 220°F, or below to produce the improved product.

By way of more specific example, 500 grams of $C_{24}+$ alpha olefinic material having the following analysis:

| | |
|---|---|
| $C_{24}$ to $C_{28}$ | 35 to 48% by weight |
| $C_{30}+$ | 50 to 65% by weight |